(12) United States Patent
Doherty et al.

(10) Patent No.: US 11,565,326 B2
(45) Date of Patent: Jan. 31, 2023

(54) ADDITIVELY MANUFACTURED NON-CONTACT SUPPORT

(71) Applicant: Raytheon Technologies Corporation, Farmington, CT (US)

(72) Inventors: Adam Z. Doherty, Suffield, CT (US); Christopher F. O'Neill, Hebron, CT (US); John P. Rizzo, Jr., Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 272 days.

(21) Appl. No.: 16/860,534

(22) Filed: Apr. 28, 2020

(65) Prior Publication Data
US 2020/0254525 A1 Aug. 13, 2020

Related U.S. Application Data

(62) Division of application No. 14/620,566, filed on Feb. 12, 2015, now Pat. No. 10,668,532.

(51) Int. Cl.
*B33Y 80/00* (2015.01)
*B22F 10/47* (2021.01)
(Continued)

(52) U.S. Cl.
CPC .............. *B22F 12/00* (2021.01); *B22F 10/40* (2021.01); *B22F 10/47* (2021.01); *B29C 64/153* (2017.08);
(Continued)

(58) Field of Classification Search
CPC .......... B22F 12/00; B22F 10/40; B22F 10/47; B22F 10/10; B22F 2999/00; B22F 10/20;
(Continued)

(56) References Cited

U.S. PATENT DOCUMENTS

| 5,352,405 A | 10/1994 | Beaman et al. |
| 6,534,740 B1 | 3/2003 | Meiners et al. |

(Continued)

FOREIGN PATENT DOCUMENTS

| EP | 1486318 A2 | 12/2004 | |
| GB | 2515287 A | * 12/2014 | ............ B22F 3/1055 |

(Continued)

OTHER PUBLICATIONS

European Search Report dated Jul. 1, 2016 issued for European Patent Application No. 16155047.0.

*Primary Examiner* — Lawrence Averick
(74) *Attorney, Agent, or Firm* — Bachman & LaPointe, P.C.

(57) ABSTRACT

An additively manufactured assembly including an additively manufactured component with an edge oriented with respect to a recoater blade direction and an non-contact support that does not form a part of the additively manufactured component, the additively manufactured support located adjacent the edge. A method of additively manufacturing a component includes additively manufacturing an component with an edge oriented with respect to a recoater blade direction simultaneous with additively manufacturing an non-contact support that does not form a part of the component, the additively manufactured support located adjacent the edge.

14 Claims, 4 Drawing Sheets

(51) Int. Cl.
  *B22F 10/40* (2021.01)
  *B22F 12/00* (2021.01)
  *B33Y 10/00* (2015.01)
  *B29C 64/153* (2017.01)
  *B29C 64/40* (2017.01)
  *B22F 10/10* (2021.01)

(52) U.S. Cl.
  CPC .............. *B29C 64/40* (2017.08); *B33Y 10/00* (2014.12); *B33Y 80/00* (2014.12); *B22F 10/10* (2021.01); *B22F 2999/00* (2013.01); *Y02P 10/25* (2015.11)

(58) Field of Classification Search
  CPC ..... B29C 64/153; B29C 64/40; B29C 64/182; B33Y 10/00; B33Y 80/00; Y02P 10/25

See application file for complete search history.

(56) References Cited

U.S. PATENT DOCUMENTS

| | | |
|---|---|---|
| 6,815,636 B2 | 11/2004 | Chung et al. |
| 7,084,370 B2 | 8/2006 | Hagemeister et al. |
| 7,435,072 B2 | 10/2008 | Collins et al. |
| 7,521,652 B2 | 4/2009 | Chung et al. |
| 8,684,069 B2 | 4/2014 | Mottin et al. |
| 10,124,540 B2 | 11/2018 | Ooba et al. |
| 2002/0152002 A1 | 11/2002 | Lindemann et al. |
| 2010/0143868 A1 | 6/2010 | Hintersehr |
| 2010/0324715 A1 | 12/2010 | Yang et al. |
| 2011/0106290 A1 | 5/2011 | Hövel et al. |
| 2011/0135840 A1* | 6/2011 | Doye .................... B23K 35/38 118/723 R |
| 2011/0253878 A1 | 10/2011 | Klahn et al. |
| 2012/0018115 A1 | 1/2012 | Hövel et al. |

FOREIGN PATENT DOCUMENTS

| | | |
|---|---|---|
| GB | 2515287 A | 12/2014 |
| WO | 2014208743 A1 | 12/2014 |

\* cited by examiner

ADDITIVELY MANUFACTURED NON-CONTACT SUPPORT

CROSS REFERENCE TO RELATED APPLICATIONS

This application is a divisional of U.S. patent application Ser. No. 14/620,566, filed Feb. 12, 2015.

BACKGROUND

The present disclosure relates to additive manufacturing and, more particularly, to an additively manufactured non-contact support.

Direct metal laser sintering (DMLS) is an additive manufacturing technique in which a laser is utilized to sinter powdered material. The laser may be guided by a 3D model to bind the powdered material and grow a solid structure component.

When constructing the component via DMLS, a recoat direction must be considered, as attempts to construct an "unfriendly" angle, such as an acute angle that faces the recoater blade, may be difficult, if not impossible without damage thereto. When the recoater blade reaches the sharp edge formed by the acute between the part and the build plate, the recoater blade may damage the component, the recoater blade may be damaged, and/or the build will fail.

The current solution for such unfriendly angles is to extrude the surface itself down to the build plate, sacrifice other properties, or increase build time to achieve a more suitable orientation.

SUMMARY

An additively manufactured assembly according to one disclosed non-limiting embodiment of the present disclosure includes an additively manufactured component with an edge oriented with respect to a recoater blade direction and an additively manufactured non-contact support that does not form a part of the additively manufactured component, the additively manufactured support located adjacent the edge.

A further embodiment of the present disclosure includes, wherein the additively manufactured non-contact support includes a non-contact support contoured surface adjacent to a contour of the additively manufactured component that forms the edge thereof.

A further embodiment of any of the foregoing embodiments of the present disclosure includes, wherein the contour of the additively manufactured component that forms the edge thereof is a windward side of the additively manufactured component with respect to the recoater blade direction.

A further embodiment of any of the foregoing embodiments of the present disclosure includes, wherein the non-contact support contoured surface is a leeward side of the additively manufactured non-contact support with respect to the recoater blade direction.

A further embodiment of any of the foregoing embodiments of the present disclosure includes, wherein the non-contact support contoured surface is a leeward side of the additively manufactured non-contact support with respect to the recoater blade direction.

A further embodiment of any of the foregoing embodiments of the present disclosure includes, wherein the additively manufactured non-contact support includes a windward side that forms a surface amenable to passage of a recoater blade along the recoater blade direction.

A further embodiment of any of the foregoing embodiments of the present disclosure includes, wherein the additively manufactured non-contact support includes a non-contact support contoured surface adjacent to a contour of the additively manufactured component that forms the edge thereof, a space distance between the non-contact support contoured surface and the contour of the additively manufactured component is between about 0.003-0.015 inches (0.076-0.381 mm).

A further embodiment of any of the foregoing embodiments of the present disclosure includes, wherein the additively manufactured non-contact support includes a non-contact support contoured surface adjacent to a contour of the additively manufactured component that forms the edge thereof, a space distance between the non-contact support contoured surface and the contour of the additively manufactured component is between about 0.005-0.01 inches (0.127-0.254 mm).

A further embodiment of any of the foregoing embodiments of the present disclosure includes, wherein the additively manufactured non-contact support includes a non-contact support contoured surface adjacent to a contour of the additively manufactured component that forms the edge thereof, the non-contact support contoured surface ends about commensurate with a vertical location at which the contour of the additively manufactured component is vertical.

A further embodiment of any of the foregoing embodiments of the present disclosure includes, wherein the contour of the additively manufactured component that forms the edge thereof form an acute angle with respect to the recoater blade direction.

A method of additively manufacturing an assembly according to another disclosed non-limiting embodiment of the present disclosure includes simultaneous additively manufacturing a component with an edge oriented with respect to a recoater blade direction and a non-contact support that does not form a part of the component, the support located adjacent the edge.

A further embodiment of any of the foregoing embodiments of the present disclosure includes simultaneously additively manufacturing the component and the non-contact support to a reception plate.

A further embodiment of any of the foregoing embodiments of the present disclosure includes removing the component and the non-contact support from the reception plate such that the non-contact support separates from the component.

A further embodiment of any of the foregoing embodiments of the present disclosure includes wherein the edge of the component is oriented with respect to a recoater blade direction at an acute angle.

A further embodiment of any of the foregoing embodiments of the present disclosure includes spacing the non-contact support contoured surface and the contour of the component at a space distance between about 0.003-0.015 inches (0.076-0.381 mm).

A further embodiment of any of the foregoing embodiments of the present disclosure includes spacing the non-contact support contoured surface and the contour of the component at a space distance between about 0.005-0.01 inches (0.127-0.254 mm).

A further embodiment of any of the foregoing embodiments of the present disclosure includes ending the non-contact support contoured surface about commensurate with a vertical location at which the contour of the component is vertical.

A further embodiment of any of the foregoing embodiments of the present disclosure includes ending the non-contact support contoured surface vertically beyond a vertical location at which the contour of the component is vertical.

A further embodiment of any of the foregoing embodiments of the present disclosure includes orienting a windward side of the non-contact support to form a surface amenable to passage of a recoater blade along the recoater blade direction.

A further embodiment of any of the foregoing embodiments of the present disclosure includes spacing the non-contact support contoured surface and the contour of the component at a space distance which prevents connection of the non-contact support contoured surface and the component via the additive manufacturing process.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
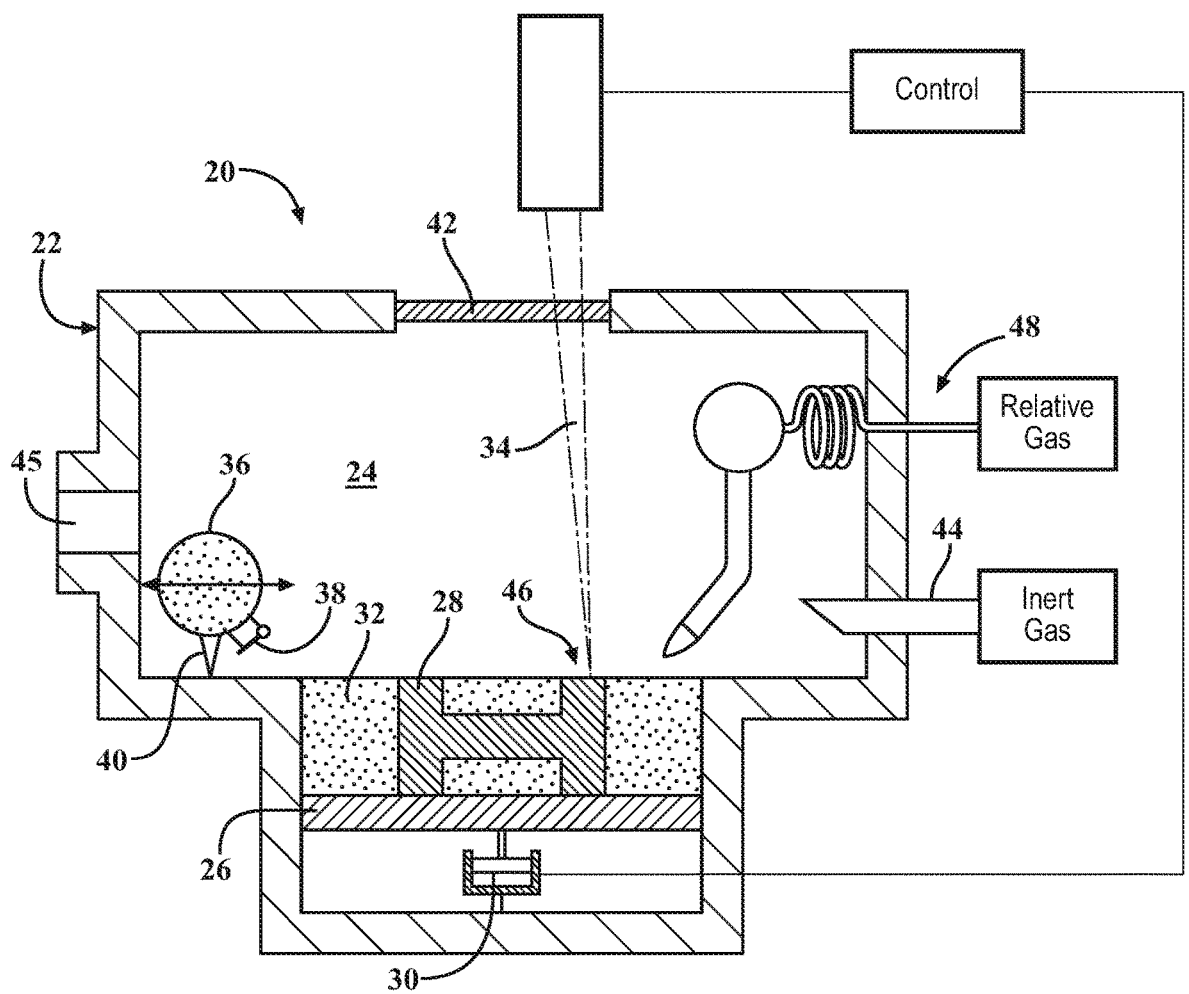
FIG. 1 is a schematic cross section of an exemplary embodiment of an additive manufacturing process space.

FIG. 1 schematically illustrates a Direct Metal Laser Sintering (DMLS) system 20 that may have particular applicability to an additive manufacturing process. The system 20 generally incudes a process chamber 22 that forms a process space 24 in which a plate 26 for a component 28 (additively manufactured component 28) to be produced is located. This reception plate 26 can be lowered by an actuator 30, so that the component 28 can be produced in a stock of powder 32 of the material for the component, while, in each case after a ply of the component 28 has been produced by a laser beam 34, the reception plate 26 is lowered by the thickness of the ply. A movable stock container 36 with a dispenser 38 and a recoater blade 40 can be moved over and above the stock or powder 32, with the result that, after the lowering of the reception plate 26, a further ply of powder can be applied and leveled the recoater blade 40.

The process chamber 22 includes a window 42 through which the laser beam 34 is directed. Furthermore, the process chamber has an inlet 44 and an outlet 45 through which a process gas is conducted through the process chamber 22. This inert process gas sweeps over the surface of the component 28, to minimize unwanted reactions of the melting bath 46 of component material with gaseous constituents so as to discharge possible evaporation products of the component material through the outlet 45. A feed gas 48 may also be provided through which a reactive gas can be communicated to causes the formation of a layer region with a composition different from that of the component material.

Although Direct Metal Laser Sintering (DMLS) system 20 is schematically illustrated it should be appreciated that other additive manufacturing processes such as selective laser melting (SLM) that also utilize a recoater blade will also benefit herefrom. The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The additive manufacturing process facilitates manufacture of relatively complex geometry components to minimize assembly details and multi-component construction. The additive manufacturing process fabricates or "grows" components using three-dimensional information, for example a three-dimensional computer model. The three-dimensional information is converted into a plurality of slices, each slice defining a cross section of the component for a predetermined height of the slice. The additive manufactured component is then "grown" slice by slice, or ply by ply, until finished.

Figure 2:
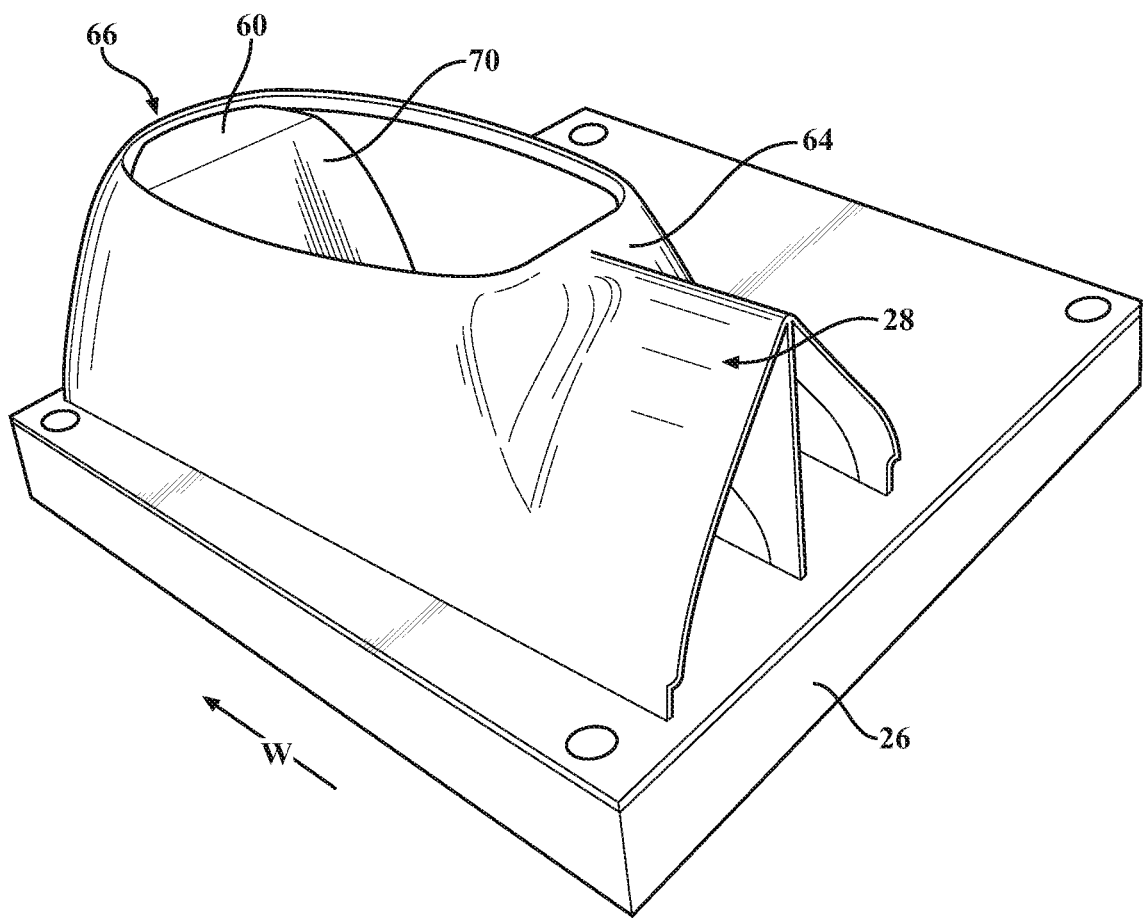
FIG. 2 is a schematic view of an additive manufactured component on a reception plate.
Figure 3:
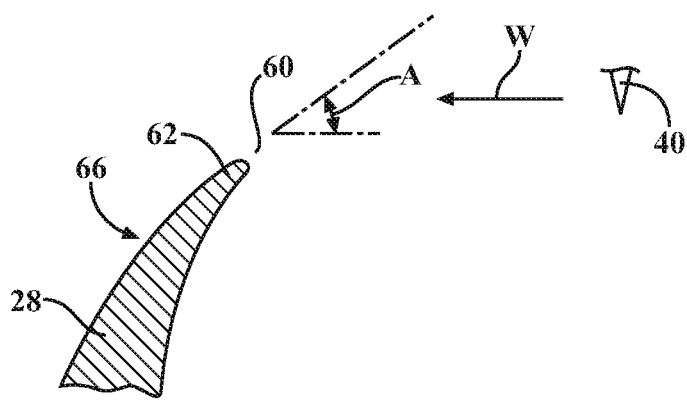
FIG. 3 is a schematic sectional view of an edge of the additive manufactured component.

With reference to FIG. 2, the additively manufactured component 28 is grown on the reception plate 26 and the recoater blade 40 sweeps across the surface thereof in a linear recoat direction as indicated by arrow W. In this disclosed non-limiting embodiment, the manufactured component 28 includes an edge 60 that is arranged at an acute build angle A with respect to movement of the recoater blade 40 (FIG. 3).

In this example, the edge 60 is formed by a lip 62 that that rolls inward such as is typical of an aerodynamic intake. As such, one side 64 of the edge 60 is "friendly" to the linear recoat direction as it forms an obtuse angle, while the opposite side 66 of the edge 60 is "unfriendly" to the linear recoat direction as it forms an acute angle. To obviate this "unfriendly" side 66 of the edge 60 to the linear recoat direction, an additively manufactured non-contact support 70 that does not form a part of the additively manufactured component 28 is simultaneously additively manufactured on the reception plate 26 to operate as a buffer between the acute build angles and the recoater blade 40.

Figure 4:
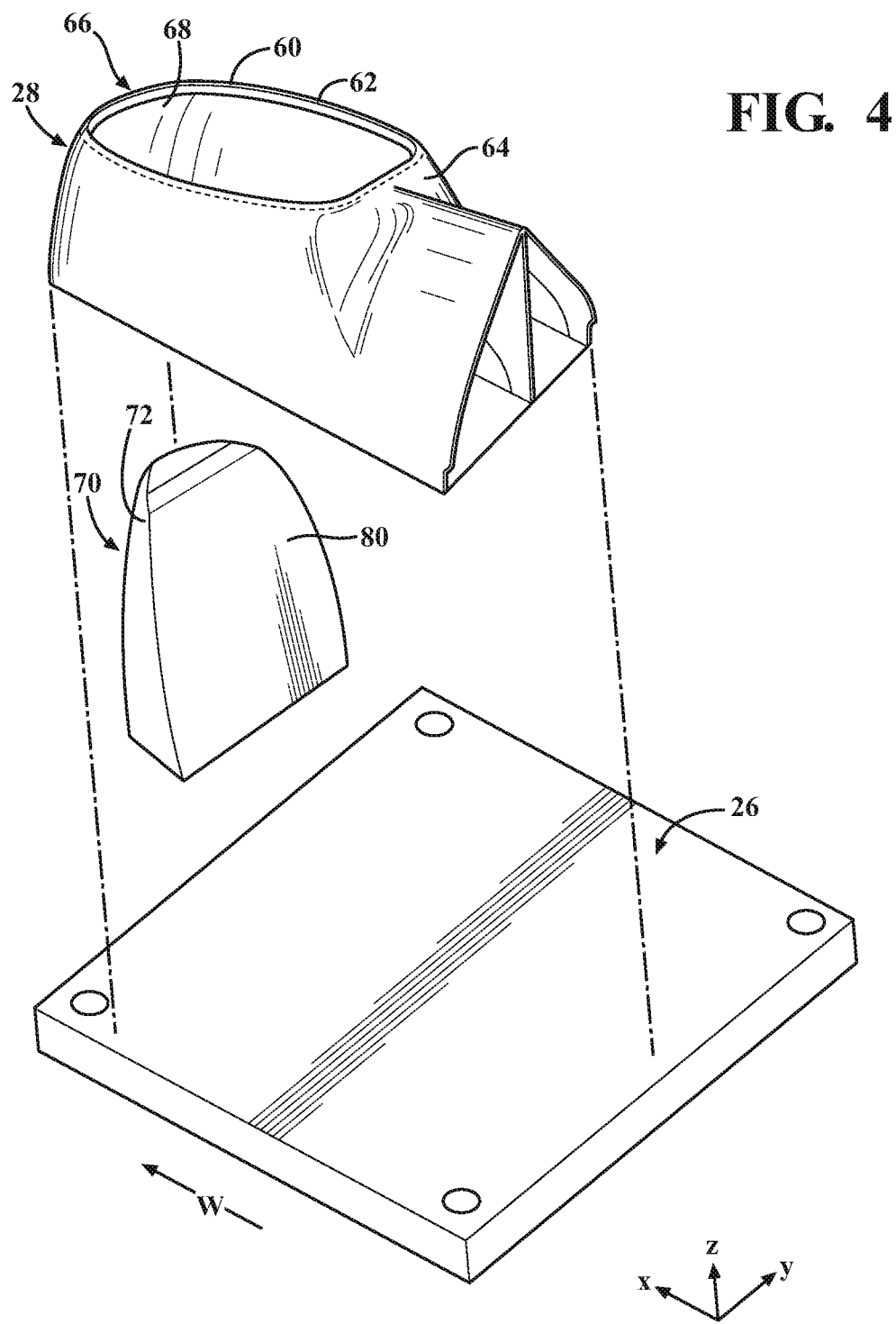
FIG. 4 is an exploded view of the additive manufactured component, a sacrificial additively manufactured non-contact support, and a reception plate.
Figure 5:
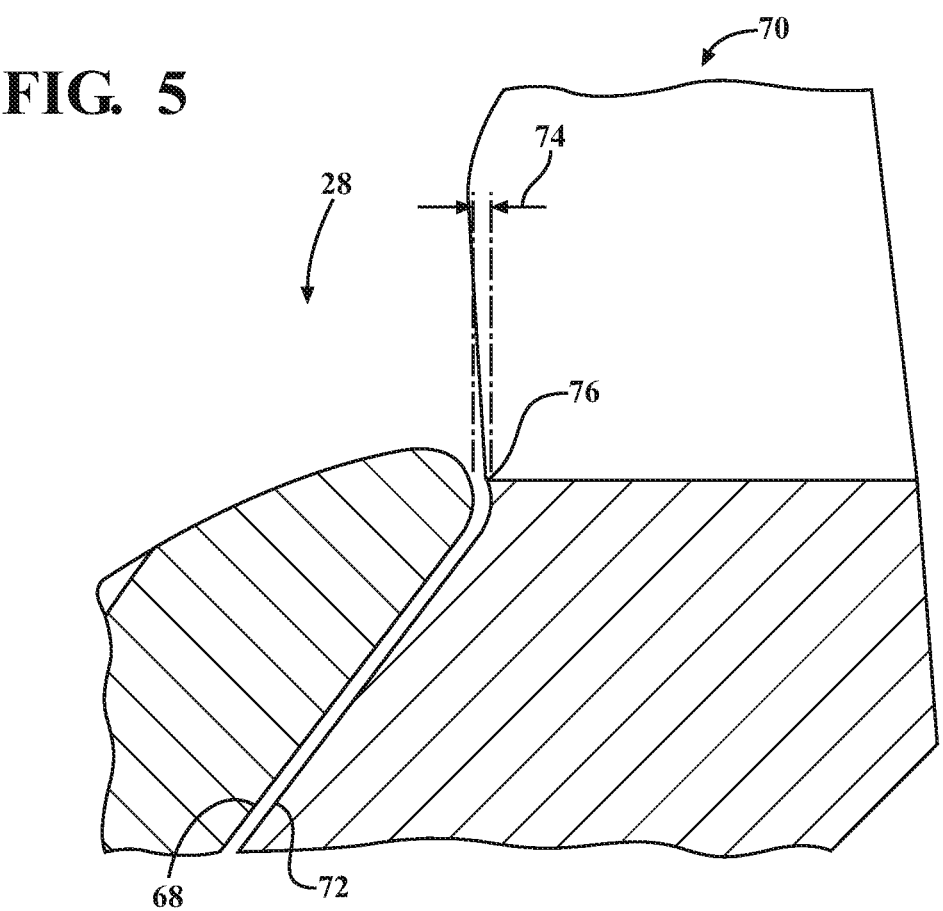
FIG. 5 is an expanded sectional view of the edge of the additive manufactured component.
Figure 6:
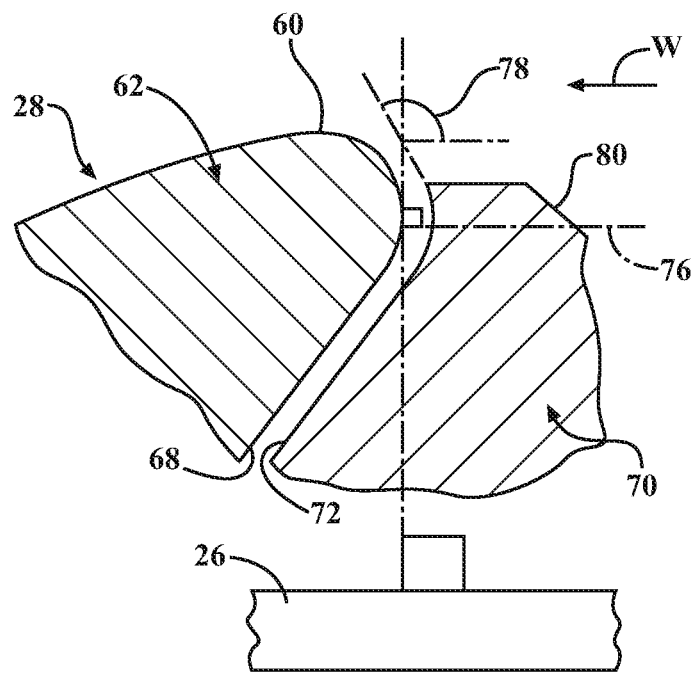
FIG. 6 is an expanded sectional view of the additive manufactured component and the sacrificial additively manufactured non-contact support.

With reference to FIG. 4, the additively manufactured non-contact support 70 includes a non-contact support contoured surface 72 that is essentially the leeward side of the non-contact support contoured surface 72 with respect to the linear recoat direction W. The non-contact support contoured surface 72 is spaced from the additively manufactured component 28 by a space distance 74 about 0.003-0.015 inches (3-15 thou; 0.076-0.381 mm), and more particularly, by about 0.005-0.01 inches (0.127-0.254 mm) parallel to an X-Y plane defined by the reception plate 26 (FIG. 5). In this example, the space distance 74 is arranged to follow a contour 68 of the opposite side 66 of the edge 60 until the contour 68 become vertical, i.e., perpendicular to the X-Y plane (FIG. 6). The contoured surface 72 of the non-contoured support 70 may extend to a vertical 76 or even form an obtuse angle 78 (FIG. 6) to the linear recoat direction "W" of the recoater blade 40 to form a surface more amenable to the DMLS process that readily allows the recoater blade 40 to pass gently to the angled surface on the additively manufactured component 28.

A windward side 80 of the non-contact support 70 is opposite the non-contact support contoured surface 72 with respect to the linear recoat direction W. The windward side 80 may be formed at various angles and directions, to provide a surface amenable to the DMLS process that readily allows the recoater blade 40 to pass as the additively manufactured non-contact support 70 does not form a part of the additively manufactured component 28.

Once, the additively manufactured component 28 is completed, the additively manufactured non-contact support 70 and the additively manufactured component 28 are removed from the reception plate 26 such as via electron discharge machining or other conventional process such that the additively manufactured non-contact support 70 simply falls away or separates from the additively manufactured component 28.

Utilization of the additively manufactured non-contact support 70 further opens the window as to what components can be constructed via additive manufacturing.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. An additively manufactured assembly, comprising:
an additively manufactured component with a component edge oriented with respect to a recoater blade direction, the additively manufactured component additively manufactured on a reception plate that defines an X-Y plane, the component comprises the component edge oriented toward and at an acute angle with respect to the recoater blade linear recoat direction that is parallel to the reception plate, a contour of the additively manufactured component that forms the component edge thereof is a windward side of the additively manufactured component with respect to the recoater blade direction; and
an additively manufactured non-contact support that does not form a part of the additively manufactured component, the additively manufactured non-contact support located adjacent the component edge, a contoured surface of the non-contact support forming an obtuse angle with respect to the linear recoat direction once the contour becomes at least perpendicular to the X-Y plane with respect to the linear recoat direction, a non-contact support contoured surface ended commensurate with a location of the component at which the contour of the component is perpendicular to the X-Y plane, the non-contact support contoured surface and the contour of the component at a space distance which prevents connection of the non-contact support contoured surface and the component via the additive manufacturing process, wherein the additively manufactured non-contact support includes the non-contact support contoured surface adjacent to the contour of the additively manufactured component that forms the component edge thereof, the space distance between the non-contact support contoured surface and the contour of the additively manufactured component is between about 0.003-0.015 inches (0.076-0.381 mm).

2. The additively manufactured assembly as recited in claim 1, wherein the additively manufactured non-contact support includes the non-contact support contoured surface adjacent to the contour of the additively manufactured component that forms the component edge thereof.

3. The additively manufactured assembly as recited in claim 2, wherein the contour of the additively manufactured component that forms the component edge thereof is the windward side of the additively manufactured component with respect to the recoater blade direction.

4. The additively manufactured assembly as recited in claim 3, wherein the non-contact support contoured surface is a leeward side of the additively manufactured non-contact support with respect to the recoater blade direction.

5. The additively manufactured assembly as recited in claim 2, wherein the non-contact support contoured surface is a leeward side of the additively manufactured non-contact support with respect to the recoater blade direction.

6. The additively manufactured assembly as recited in claim 5, wherein the additively manufactured non-contact support includes the windward side that forms a surface amenable to passage of the recoater blade along the recoater blade direction.

7. The additively manufactured assembly as recited in claim 1, wherein the space distance between the non-contact support contoured surface and the contour of the additively manufactured component is between about 0.005-0.01 inches (0.127-0.254 mm).

8. The additively manufactured assembly as recited in claim 1, wherein the additively manufactured non-contact support includes the non-contact support contoured surface adjacent to the contour of the additively manufactured component that forms the component edge thereof, the non-contact support contoured surface ends about commensurate with a vertical location at which the contour of the additively manufactured component is vertical.

9. The additively manufactured assembly as recited in claim 8, wherein the contour of the additively manufactured component that forms the component edge thereof forms the acute angle with respect to the recoater blade direction.

10. An additively manufactured assembly, comprising:
an additively manufactured component with a component edge oriented with respect to a recoater blade direction in an X-Y plane, the component edge having a contour oriented toward and at an acute angle with respect to the X-Y plane facing toward the recoater blade direction; and
an additively manufactured non-contact support that does not form a part of the additively manufactured component, the additively manufactured non-contact support located adjacent the component edge and comprising a contoured surface facing the contour of the additively manufactured component and forming an obtuse angle with respect to the X-Y plane facing toward the recoater blade direction, and further comprising a windward side that forms a surface amenable to passage of the recoater blade along the recoater blade direction.

11. The additively manufactured assembly as recited in claim 10, wherein the surface of the windward side forms an obtuse angle with respect to the X-Y plane facing toward the recoater blade direction.

12. The additively manufactured assembly as recited in claim 10, wherein the contoured surface and the contour are substantially parallel to each other.

13. The additively manufactured assembly as recited in claim 10, wherein the contoured surface follows the contour to define a space therebetween of substantially constant width.

14. The additively manufactured assembly as recited in claim 10, wherein the contoured surface is spaced from the contour at a space distance of between about 0.003-0.015 inches (0.076-0.381 mm).

* * * * *